2,907,941

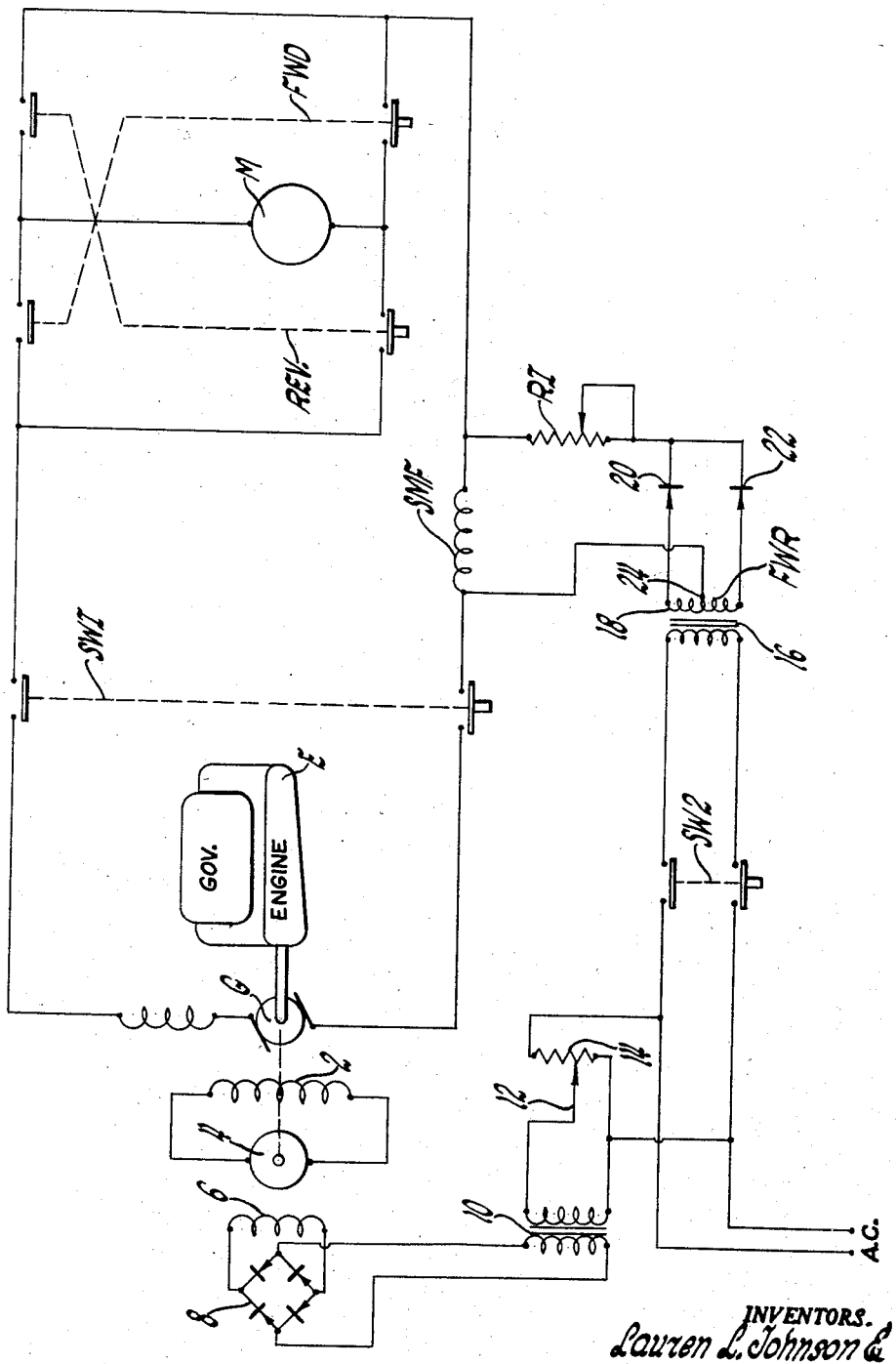

SERIES COMPOUND MOTOR CIRCUIT

Lauren L. Johnson, Westchester, and Benjamin C. Liebenthal, Downers Grove, Ill., assignors to General Motors Corporation, Detroit, Mich., a corporation of Delaware Application August 9, 1956, Serial No. 603,003

3 Claims. (Cl. 318—154)

This invention relates generally to an electrical generator-motor power transmission and control system and is particularly related to a system wherein it is desired to control motor speed where the motor is subjected to widely variable loads.

Recently there have been heavy demands by the oil drilling industry for diesel electric power to perform the various drilling operations normally encountered in the oil drilling field. The series motor connected to a generator or other controlled variable voltage source has been found satisfactory for most of the oil drilling power operations. There are, however, a few operating requirements which are not easily met with the simple series motor.

One example of an instance where the series motor is not entirely satisfactory is where it is necessary to change motor speed from one value to another quickly enough to require decelerating power. Obviously, cumulative compound separately excited motors could be used to meet this requirement but the latter types of motors involve transient behaviors which require special protection, unnecessary for other operational drives usually found in an oil well drilling rig. Furthermore, if compound motors are used it means additional windings must be added to the field structure of the motor which complicate the stator somewhat physically, and also add to the cost.

It is therefore a primary object of the present invention to modify a series motor by external circuitry so as to achieve the motor characteristics desired without modifying the physical make-up of the motor itself.

In the discussion which is to follow it should be appreciated that the motor is connected across a generator whose voltage may be varied by an operator's control and the motor is adapted to be coupled to different characteristic loads by means of suitable clutches. In one instance the load may be capable of absorbing the full output of the motor and in another the load may be so small as to be almost negligible. The situation may be further complicated by the fact that the large load requires high motor speed and the small load a lower or perhaps even relatively low speed. While the simple series motor is capable of handling large loads at relatively high speeds it will be appreciated that due to its characteristics and electrical make-up that without certain modification it might be unsatisfactory for small loads at low speeds.

For a fuller understanding of the invention and the various objects thereof reference may be had to the following detailed description and accompanying drawing whose single figure is a schematic diagram of a generator-motor power transmission and control embodying the invention.

Turning now to the drawing, a generator G is shown which is coupled to be driven by an engine E, in this instance a diesel engine. The engine E may be operated at a plurality of preselected engine speeds whose speeds are controlled by an electrical hydraulic governor GOV. The generator G is provided with a separately excited winding 2 connected across the armature of an exciter machine 4 also driven by the engine E. The armature of the exciter 4 in turn is provided with a winding 6 connected to the output of a full-wave rectifier 8. The rectifier 8 in turn receives input power from a transformer 10 whose input is varied by a manual operator's control 12 which includes the operating coil 14 of a variable resistor connected across a fixed alternating voltage source indicated by the letters AC. Movement then of the operator's control 12 will control the excitation and consequently the voltage of the generator G in a straightforward manner. A motor M is shown having an armature and a series field winding SMF. The motor M is adapted to be connected across the generator G by closure of the contactors of a switch SW1. The motor M may be connected for rotation in opposite directions by generator G through alternate closure of forward and reverse switches FWD and REV, respectively. Connected across the series field SMF of the motor M is a rectifier circuit which includes, in series, a resistor R1 and a full-wave rectifier FWR. A transformer 16 whose secondary winding 18 forms a part of full-wave rectifier FWR has its primary winding adapted to be connected across the A.C. voltage source by closure of the contactors of switch SW2. Also forming a part of the full-wave rectifier are a pair of rectifiers 20 and 22 connected in parallel with each other from a center tap 24 on a winding 18 and in series with resistor R1. The magnitude of the resistor R1 and the polarity of the full-wave rectifier FWR are such that current which is induced to flow in the rectifier circuit and in the series field SMF will be less than the full-load current of the motor M and will flow in the same direction as that caused to flow through the field SMF by the generator G.

The operation is as follows:

Assuming the operator has moved his control 12 so as to provide the generator G with minimum excitation, the voltage of generator G will be reduced to a relatively small value. Since, as designed, rectifier FWR supplies less current to the series field SMF than is required for full power operation of motor M and the current supply to the field by the rectifier circuit FWR is relatively large, the excitation of the series field due to the rectifier circuit will give the motor a relatively constant speed operation over a small-load range and the operator can select this speed by means of the generator field control (which varies generator voltage) within certain limits. Thus one of the requirements of the special control is met because the motor armature current will actually be less than the partial excitation current resulting in motor characteristics similar to a compound or separately excited machine.

Assume now that a heavy load is coupled to the motor M until the motor armature current exceeds the fixed value of excitation provided by the rectifier circuit FWR. The motor M then becomes a series motor.

To better understand the operation of the invention a sequence of events will be described. This sequence may start, for example, with the driller engaging the main hoist clutch to either raise or lower drill pipe from or into the drill hole and increasing generator excitation to maximum with the control 12. This will cause the generator voltage and current to rise. As the generator (also motor) current increases to a value equal to that supplied by the rectifier circuit FWR, the rectifier current decreases to zero and the motor runs as a series motor. As the hoisting operation nears completion, however, the generator excitation is reduced by the control 12 and the motors declutched perhaps running much faster than permissible for the next operation. However, when the generator excitation is reduced by the driller the voltage drops, and since the load is dropped from the motors, the armature current will also drop. When the armature current falls below that normally supplied to the motor field by the rectifier circuit FWR the motor beings to behave as a separately excited machine and should the motor voltage exceed that of the generator the current will reverse making the motor behave as a generator. This will absorb the kinetic energy of the rotating parts and decelerate the motor. The rate of motor decelerating current is limited in this instance since it subtracts from the partial excitation applied by the rectifier circuit FWR to the motor field. This latter feature additionally protects both mechanical and electrical aspects of the motors and generators and their associated equipment. To obtain a somewhat steeper motor characteristic, i.e., a different range through which the motor makes the transition from a separately excited or compound motor to a series motor, added resistance such as the resistor R1 may be placed in the rectifier circuit or in the circuit including the primary winding of the transformer 16 which supplies the rectifier circuit. The resistor R1 causes the rectifier voltage to rise as its current decreases (due to an increase in motor armature current) so as to obtain the motor characteristic desired. Although the resistor R1 is shown in the output circuit of the rectifier where it is most effective since it limits transient currents, it should be appreciated that the transformer itself could be designed to have different resistive characteristics or the resistance could be placed in the primary circuit of the transformer 16.

The following explanation is offered to fully appreciate why the motor M acts as a true series motor once the motor armature current becomes the same as the current flowing through the series field due to the rectifying circuit FWR. As the motor armature current increases it presumably will be when the generator voltage also increases. Due to increased excitation of the generator the current flowing through the motor armature tends to flow through the rectifier circuit FWR as well as the series field due to the inherent resistance in the series field. No such current can flow through the rectifier circuit from the positive side of the series field to the negative side thereof due to the presence of the rectifiers 20 and 22. While no current can actually flow in this direction the magnitude of the voltage and current caused by the demand of the motor M can become great enough to prevent any current flow in the rectifier circuit which would otherwise be caused by the A.C. voltage source and transformer 16. When the magnitude of the generator voltage and current (also motor armature current) is such that no current flows through the rectifier circuit FWR the current flowing through the motor armature will, of course, be the same as that flowing through the field SMF thereby obtaining a simple series motor characteristic.

From the foregoing description it will be appreciated that a system has been provided in which a series motor may be used which automatically allows the motor to act as a series motor under certain conditions (heavy loads) and as a separately excited or a compound motor under light loads. By means of this system motor protection in the form of speed limit is provided for a series motor when coupled to relatively light loads.

We claim:
1. In a generator-motor power transmission system including an engine-driven generator and a motor adapted to be operatively connected thereto, an armature and a field for said motor connected in series across said generator, a fixed A.C. voltage source, a transformer having a primary winding connected across said A.C. source and a secondary winding, a pair of rectifiers in circuit with said secondary winding and forming therewith a full-wave rectifier connected across said field, the output and connections of said rectifier being such as to cause current to flow through said field in the direction of flow in which current is caused to flow through said field by said generator and whose maximum value is restricted to less than the full-load current of said motor whereby said motor has compound motor characteristics below said value and series motor characteristics above said value.

2. In a motor circuit including a motor having a motor armature and field in series with each other and adapted to be connected across a variable voltage source and to have the armature coupled to a variable load, a fixed A.C. voltage source, a transformer having a primary winding connected across said A.C. source and a secondary winding, a pair of rectifiers in circuit with said secondary winding and forming therewith a full-wave rectifier connected across said field, the output of said rectifier and the connections of said field thereto causing current to flow through said field in the direction of flow in which current is caused to flow through said field when connected across said variable voltage source and whose maximum value is restricted to less than the full-load current of said motor whereby said motor has compound motor characteristics below said value and series motor characteristics above said value.

3. In a motor circuit including a motor having an armature and field in series with each other and adapted to be connected across a variable voltage source and to have the armature coupled to a variable load, an external circuit comprising a fixed A.C. voltage source, a transformer having a primary winding connected across said A.C. source and a secondary winding, a pair of rectifiers in circuit with said secondary winding and forming therewith a full-wave rectifier connected across said field, the output of said rectifier and the connections of said field thereto causing current to flow through said field in the direction of flow in which current is caused to flow through said field when connected across said variable voltage source and whose maximum value is restricted to less than the full-load current of said motor whereby said motor has compound characteristics below said value and series characteristics above said value, and variable resistance means in series with said field across the output of said rectifier to vary said value at which characteristics of said motor change.

References Cited in the file of this patent
UNITED STATES PATENTS

| | | |
|---|---|---|
| 2,811,685 | Hoffer | Oct. 29, 1957 |

FOREIGN PATENTS

| | | |
|---|---|---|
| 386,762 | Great Britain | Jan. 26, 1933 |
| 506,652 | Germany | Sept. 6, 1930 |